United States Patent
Bergeron

(12) 
(10) Patent No.: US 6,193,880 B1
(45) Date of Patent: Feb. 27, 2001

(54) ADJUSTABLE DOWNSPOUT SCREENING DEVICE

(76) Inventor: Julien P. Bergeron, 4013 Rolling Oak Dr., Winter Haven, FL (US) 33880

( * ) Notice: Subject to any disclaimer, the term of this patent is extended or adjusted under 35 U.S.C. 154(b) by 0 days.

(21) Appl. No.: 09/490,986

(22) Filed: Jan. 26, 2000

(51) Int. Cl.$^7$ .............................. B01D 29/33; B01D 35/02
(52) U.S. Cl. ..................... 210/162; 210/163; 210/236; 210/461; 210/463; 210/474; 52/12
(58) Field of Search ....................... 210/154, 162, 210/163, 170, 236, 460, 461, 463, 474; 52/12

(56) References Cited

U.S. PATENT DOCUMENTS

| | | | |
|---|---|---|---|
| 316,578 | * 4/1885 | Schumann et al. | 210/163 |
| 571,711 | * 11/1896 | Twist | 210/162 |
| 725,933 | * 4/1903 | Coleman | 210/463 |
| 906,956 | * 12/1908 | Stasch | 210/162 |
| 1,290,470 | * 4/1919 | Yordy | 210/474 |
| 1,513,650 | * 10/1924 | Stanton | 210/463 |
| 1,930,354 | * 10/1933 | Greene | 210/463 |
| 2,669,197 | * 2/1954 | Van Duzen | 210/162 |
| 3,121,684 | * 2/1964 | Bugbird | 210/474 |
| 4,285,812 | 8/1981 | Stoltz | 210/162 |
| 5,109,640 | * 5/1992 | Creson | 52/12 |
| 5,302,283 | 4/1994 | Meuche | 210/162 |
| 5,405,539 | * 4/1995 | Schneider | 210/170 |
| 5,409,602 | 4/1995 | Sorenson | 210/162 |
| 5,535,554 | 7/1996 | Harris, Jr. | 52/12 |
| 5,536,406 | 7/1996 | Silva | 210/460 |
| 5,581,934 | * 12/1996 | Arnold, Sr. | 210/162 |
| 5,709,051 | 1/1998 | Mazziotti | 52/12 |

* cited by examiner

*Primary Examiner*—Christopher Upton
(74) *Attorney, Agent, or Firm*—Joseph N. Breaux

(57) ABSTRACT

An adjustable downspout screening device that is width adjustable to allow the adjustable downspout screening device to be used with a variety of gutter downspout sizes.

1 Claim, 3 Drawing Sheets

ADJUSTABLE DOWNSPOUT SCREENING DEVICE

TECHNICAL FIELD

The present invention relates to anti-clog devices for building gutters and downspouts and more particularly to an adjustable downspout screening device that includes a two-part, adjustable width, screening cage having a forward screen cage portion and a back screen cage portion; the forward screen cage portion including a tubular shaped downspout insert cage secured to a bottom edge thereof and a number of insertion fingers; one insertion finger extending concentrically outward from each of every forward portion end cross members and forward portion top cross members; the back screen cage portion including two securing screws and a number of insertion finger receiving tubes equal to the number of insertion fingers forming an end of each of the back portion end cross members and back portion top cross members; each insertion finger receiving tube being sized and positioned to slidingly receiving therein the entire length of one of the insertion fingers simultaneously with the remainder of the insertion finger receiving tubes; each of the two securing screws threadably engaging one of insertion finger receiving tubes for providing a securing force against the side of an insertion finger sufficient to maintain the insertion finger within the insertion finger receiving tube at a desired user selected position such that the width of the two-part, adjustable width, screening cage is adjustable to the required width for insertion into the gutter section positioned above a downspout gutter connecting opening.

BACKGROUND ART

Gutter and downspouts often become clogged with leaves and other debris preventing them from working to channel the water off of a roof or the like to a desired drainage location. It would be a benefit, therefore, to have an adjustable downspout screening device that was width adjustable to allow the adjustable downspout screening device to be used with a variety of gutter and downspout sizes.

GENERAL SUMMARY DISCUSSION OF INVENTION

It is thus an object of the invention to provide an adjustable downspout screening device that includes a two-part, adjustable width, screening cage having a forward screen cage portion and a back screen cage portion; the forward screen cage portion including a tubular shaped downspout insert cage secured to a bottom edge thereof and a number of insertion fingers; one insertion finger extending concentrically outward from each of every forward portion end cross members and forward portion top cross members; the back screen cage portion including two securing screws and a number of insertion finger receiving tubes equal to the number of insertion fingers forming an end of each of the back portion end cross members and back portion top cross members; each insertion finger receiving tube being sized and positioned to slidingly receiving therein the entire length of one of the insertion fingers simultaneously with the remainder of the insertion finger receiving tubes; each of the two securing screws threadably engaging one of insertion finger receiving tubes for providing a securing force against the side of an insertion finger sufficient to maintain the insertion finger within the insertion finger receiving tube at a desired user selected position such that the width of the two-part, adjustable width, screening cage is adjustable to the required width for insertion into the gutter section positioned above a downspout gutter connecting opening.

Accordingly, an adjustable downspout screening device is provided. The adjustable downspout screening device includes a two-part, adjustable width, screening cage having a forward screen cage portion and a back screen cage portion; the forward screen cage portion including a tubular shaped downspout insert cage secured to a bottom edge thereof and a number of insertion fingers; one insertion finger extending concentrically outward from each of every forward portion end cross members and forward portion top cross members; the back screen cage portion including two securing screws and a number of insertion finger receiving tubes equal to the number of insertion fingers forming an end of each of the back portion end cross members and back portion top cross members; each insertion finger receiving tube being sized and positioned to slidingly receiving therein the entire length of one of the insertion fingers simultaneously with the remainder of the insertion finger receiving tubes; each of the two securing screws threadably engaging one of insertion finger receiving tubes for providing a securing force against the side of an insertion finger sufficient to maintain the insertion finger within the insertion finger receiving tube at a desired user selected position such that the width of the two-part, adjustable width, screening cage is adjustable to the required width for insertion into the gutter section positioned above a downspout gutter connecting opening.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
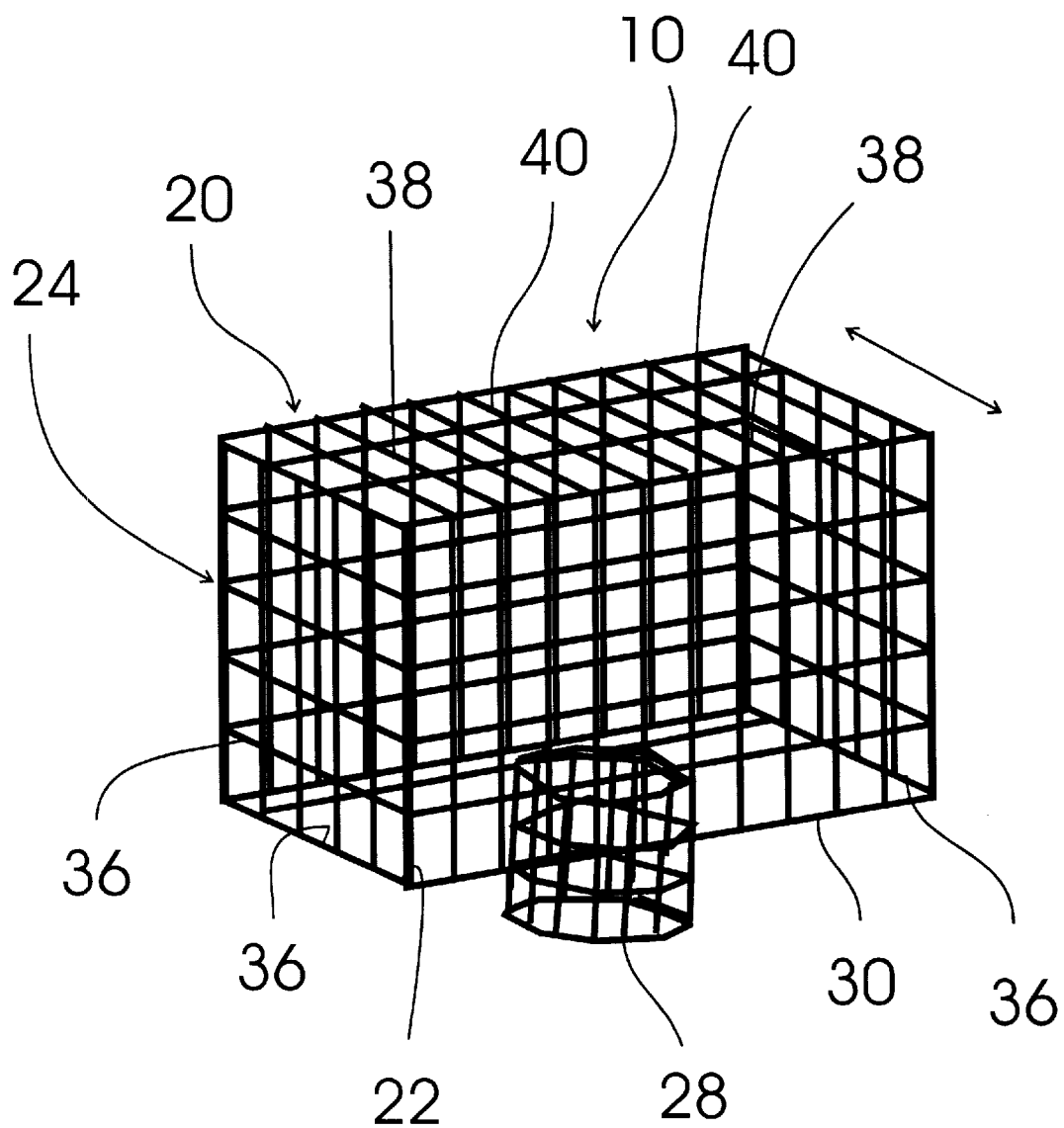
FIG. 1 is a perspective view of an exemplary embodiment of the adjustable downspout screening device showing the two-part, adjustable width, screening cage including the forward screen cage portion and the back screen cage portion; the forward screen cage portion including a tubular shaped downspout insert cage secured to a bottom edge thereof and a number of insertion fingers, one insertion finger extending concentrically outward from each of the forward portion end cross members and forward portion top cross members; the back screen cage portion including two securing screws and a number of insertion finger receiving tubes equal to the number of insertion fingers forming an end of each of the back portion end cross members and back portion top cross members; each insertion finger receiving tube being sized and positioned to slidingly receiving therein the entire length of one of the insertion fingers simultaneously with the remainder of the insertion finger receiving tubes; each of the two securing screws threadably engaging one of insertion finger receiving tubes for providing a securing force against the side of an insertion finger sufficient to maintain the insertion finger within the insertion finger receiving tube.
Figure 2:
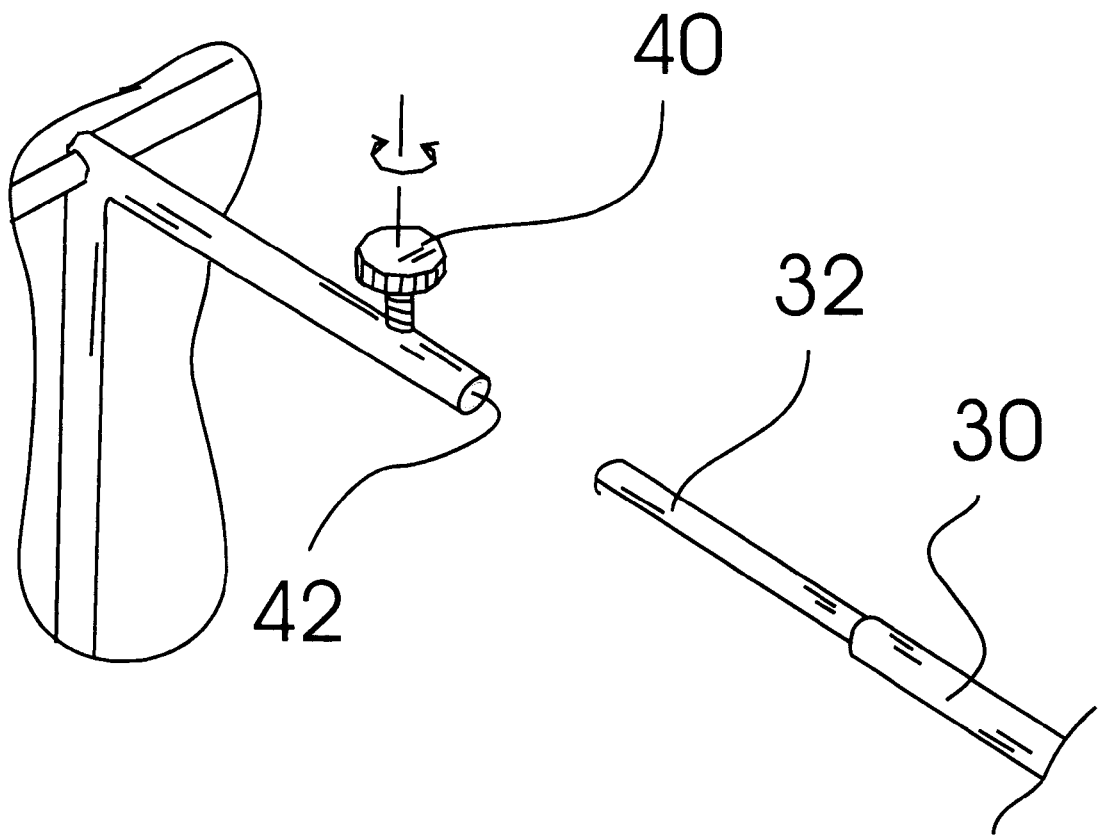
FIG. 2 is a detail perspective view showing one of the insertion fingers of the forward screen cage portion, and one of the securing screws and one of the insertion finger receiving tubes of the back screen cage portion; the threaded rod being radially oriented with respect to the insertion finger receiving tube.
Figure 3:
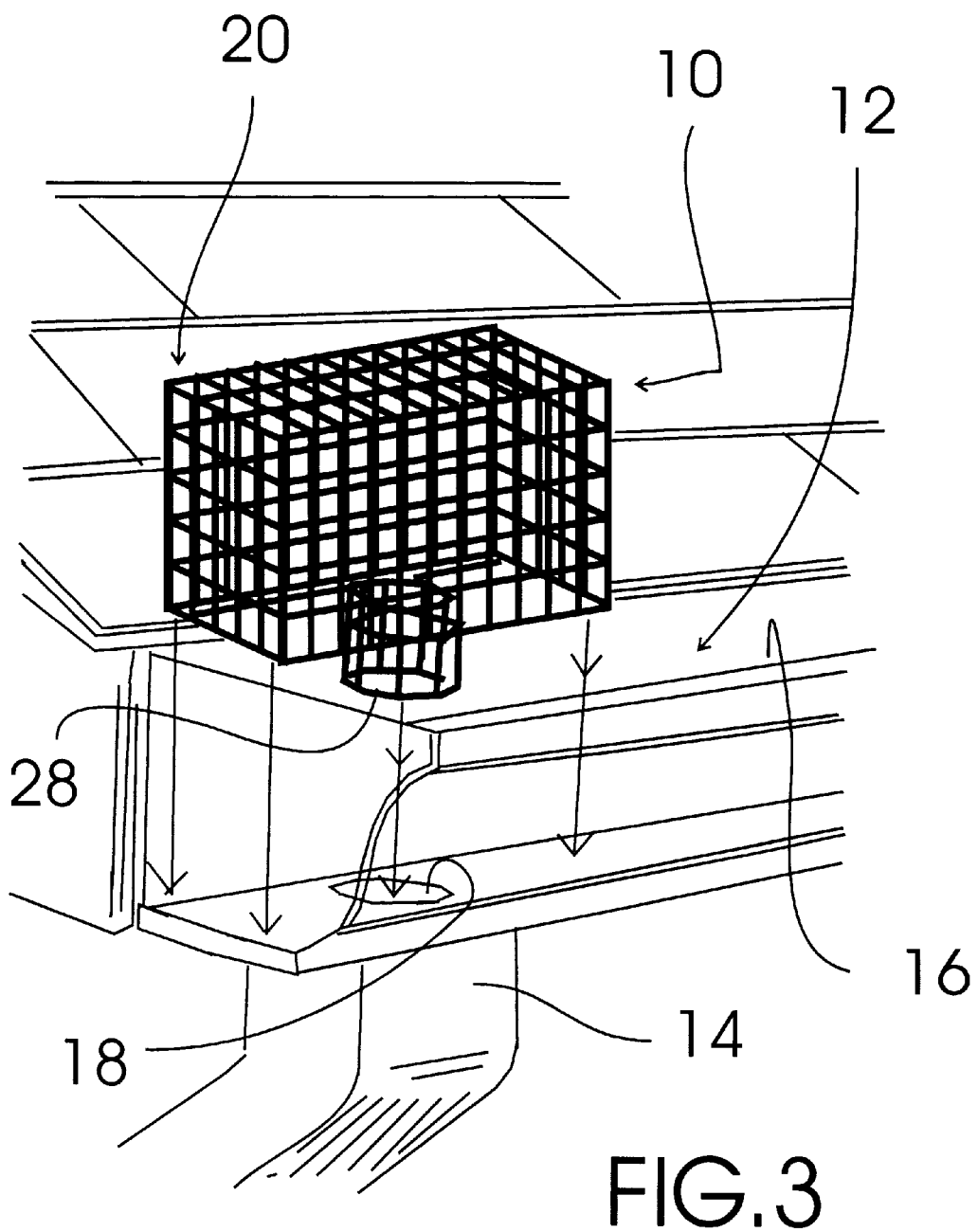
FIG. 3 is a perspective view of the exemplary adjustable downspout screening device of FIG. 1 in connection with a representative gutter and downspout assembly showing the two-part, adjustable width, screening cage adjusted to the width of the gutter and the tubular shaped downspout insert cage positioned above the downspout gutter connecting opening prior to insertion of the tubular shaped downspout insert cage into the downspout gutter connecting opening during installation.

FIGS. 1–3 show various aspects of an exemplary embodiment of the adjustable downspout screening device of the present invention generally designated 10. Adjustable downspout screening device is for use in connection with gutter and downspout assemblies, generally designated 12, including a section of downspout 14 connected to a section of gutter 16 via a downspout gutter connecting opening 18 formed through a bottom surface of gutter 16.

Adjustable downspout screening device 10 includes a two-part, adjustable width, screening cage, generally designated 20, having a forward screen cage portion, generally designated 22, and a back screen cage portion, generally designated 24. Forward screen cage portion 22 is formed of molded plastic and includes a tubular shaped downspout insert cage 28 secured to a bottom edge 30 thereof and fifteen insertion fingers 32. Each insertion finger 32 extends concentrically outward from each of every forward portion end cross member 36 and each forward portion top cross member 38.

Back screen cage portion 20 is constructed of plastic and includes two securing screws 40 and fifteen insertion finger receiving tubes 42 that form an end of each of the back portion end cross members 36 and back portion top cross members 38. Each insertion finger receiving tube 42 is sized and positioned to slidingly receiving therein the entire length of one of the insertion fingers 32 simultaneously with the remainder of the insertion finger receiving tubes 42. Each of the two securing screws 40 threadably engages one of insertion finger receiving tubes 42 for providing a securing force against the side of an insertion finger 32 sufficient to maintain the insertion finger 32 within the insertion finger receiving tube 42 at a desired user selected position such that the width of two-part, adjustable width, screening cage 20 is adjustable to the required width for insertion into the gutter section 16 an positioning tubular shaped downspout insert cage 28 into downspout gutter connecting opening 18.

It can be seen from the preceding description that an adjustable downspout screening device has been provided.

It is noted that the embodiment of the adjustable downspout screening device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An adjustable downspout screening device for use in connection with a building gutter and downspout assembly including a gutter connected to a downspout with a downspout gutter connecting opening provided through a bottom gutter surface, said adjustable downspout screening device comprising:

a two-part, adjustable width, screening cage having a forward screen cage portion and a back screen cage portion, each of said screen cage portions comprising a plurality of end cross members and a plurality of top cross members;

said forward screen cage portion including a tubular shaped downspout insert cage secured to a bottom edge thereof and a number of insertion fingers;

one insertion finger extending concentrically outward from each of every forward portion end cross members and forward portion top cross members;

said back screen cage portion including two securing screws and a number of insertion finger receiving tubes equal to said number of insertion fingers forming an end of each of said back portion end cross members and back portion top cross members;

each insertion finger receiving tube being sized and positioned to slidingly receiving therein said entire length of one of said insertion fingers simultaneously with said remainder of said insertion finger receiving tubes;

each of the two securing screws threadably engaging one of insertion finger receiving tubes for providing a securing force against said side of an insertion finger sufficient to maintain said insertion finger within said insertion finger receiving tube at a desired user selected position such that said width of said two-part, adjustable width, screening cage is adjustable to said required width for insertion into said gutter section positioned above a downspout gutter connecting opening.

\* \* \* \* \*